B. J. SUCH.
PROJECTOR FOR MOVING PICTURES.
APPLICATION FILED OCT. 3, 1916.

1,261,315. Patented Apr. 2, 1918.

Witnesses:
W. H. Jacobsen

Benjamin J. Such
Inventor

UNITED STATES PATENT OFFICE.

BENJAMIN J. SUCH, OF PERTH AMBOY, NEW JERSEY.

PROJECTOR FOR MOVING PICTURES.

1,261,315.  Specification of Letters Patent.  Patented Apr. 2, 1918.

Application filed October 3, 1916. Serial No. 123,547.

*To all whom it may concern:*

Be it known that I, BENJAMIN J. SUCH, a citizen of the United States, residing at Perth Amboy, in the county of Middlesex and State of New Jersey, have invented a new and useful Projector for Moving Pictures, of which the following is a specification.

My invention relates to moving picture projectors; and the objects of my invention are to provide a means of stopping the film at intervals, with the picture in frame, so that the action on the screen may synchronize in a measure with a dialogue or recital delivered by a human voice or by a phonograph.

I attain this object by the mechanism illustrated in the accompanying drawing, in which—

Similar letters refer to similar parts in the drawings.

Figure 1:
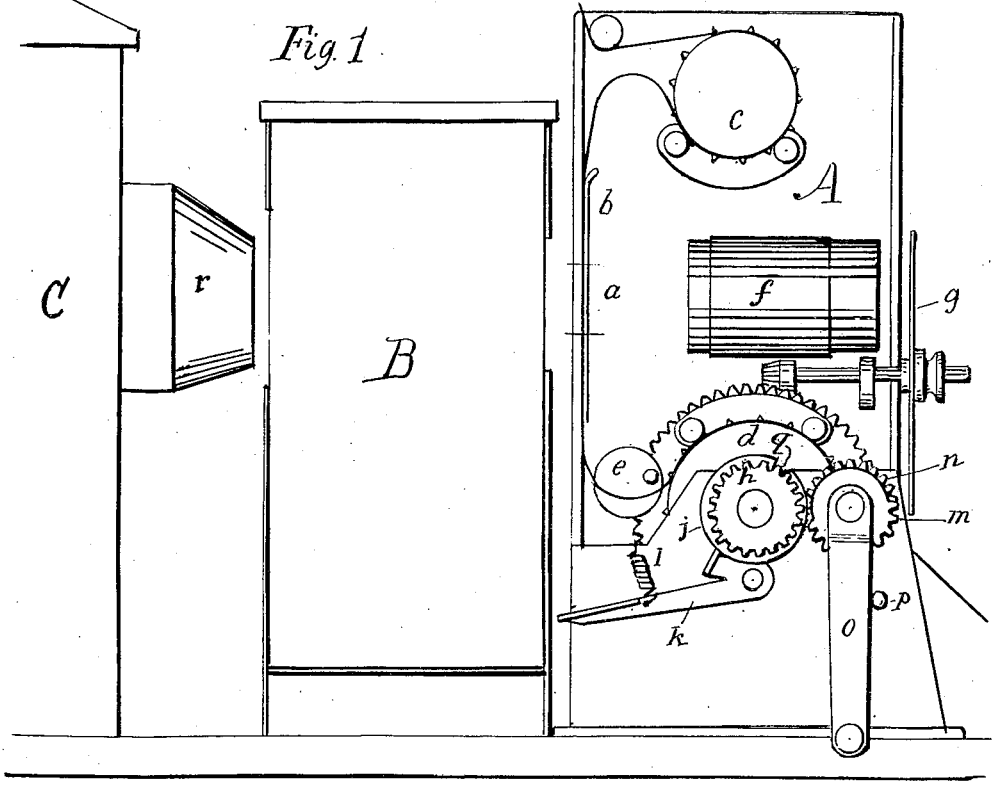
Figure 1 is a vertical view of the projector, showing a part of the lamp-house.

In Fig. 1, A is the motion head, B is a square glass reservoir of water introduced between the arc light and the film. C shows a part of the lamp-house containing the arc light. The film is drawn from the magazine by the sprocket wheel $c$, is held in position by film gate $b$, is taken over the sprocket wheel $d$ and passes thence into the take-up magazine. The magazines are not shown in the drawing. $e$ is a beater or loop-setter that imparts an intermittent movement to the film and frames each successive picture. $f$ is the lens and $g$ is the shutter that revolves close in front of the lens and prevents flicker. These features, in varied forms, are common to all projectors and form no part of my invention. In the ordinary projector the film passes the aperture at $a$ very rapidly, and if the movement should be slowed down or stopped, an automatic shutter shuts off the light and prevents ignition.

In order to stop the film without danger of igniting it, I introduce a square glass vessel B filled with clear water between the arc light and the film. One side of the metal case is omitted in the drawing in order to show the glass vessel. The rays of light, which are usually focused on the film, in passing through this volume of water are cooled without materially affecting the illumination of the picture on the screen. There is sufficient space between the film and the opening in the lamp-house to admit a reservoir containing a volume of water sufficient to protect the film from the heat of a flaming arc of 220 volts, alternating current, and about 40 amperes, for several minutes, which is, I think the strongest light used.

As the film is run at the rate of two revolutions of the wheel a second, framing sixteen pictures, it is impossible for any operator to stop at any particular picture and have it in frame.

Figure 2:
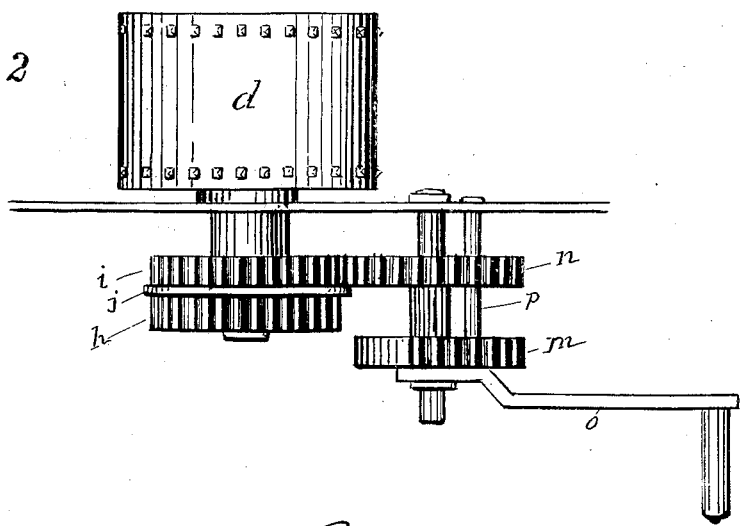
Fig. 2 is a top view of the mechanism for controlling the movement of the film.

To overcome this I provide a mechanism which will interrupt the film at every fourth or eighth picture, or it may be kept running at the usual speed. By this means the action on the screen may be made to synchronize very closely with the dialogue or speech. In the mechanism shown in Figs. 1 and 2 the spur wheels $h$ and $i$ are fixed on the shaft of the sprocket wheel $d$. Between these spur wheels there is a disk of metal $j$, slightly larger in diameter, against which a clutch $k$ is held by the spring $l$. In this disk there is a notch $q$ which engages the clutch at each revolution, framing eight pictures. By holding down this clutch the operator can keep the film running without interruption. The wheel $m$ has only a segment of spurs, sufficient, when in gear with the wheel $h$ to turn it one half revolution. The wheels $m$ and $n$ are joined together with an interval between, and can be drawn back and forth on the shaft. In order to frame only four pictures, these wheels are pushed back so that the wheel $m$ is in position to gear with the wheel $h$ and give it one half revolution. When the wheel $m$ is in position where it clears the wheel $h$ the handle bar $o$ strikes a pin $p$ which stands out just far enough to check any further movement, so that the wheel $n$ is kept in position to mesh with the wheel $i$ in the proper place when the wheels are drawn forward.

When these wheels are drawn forward and the wheel $n$ is in gear with the wheel $i$ the handle bar $o$ is far enough out to clear the pin $p$, and the film can be kept running without interruption.

I would more clearly explain the operation of the device for arresting the film as follows:

Supposing that it is desired to frame four pictures; the wheel $m$ being in position to gear with the wheel $h$, is turned until the handle $o$ strikes the pin $p$, thus giving the wheel *h* one half turn, framing four pictures. In Fig. 1 the wheel *m* is shown in the position in which it would be after it has given the wheel *h* one half revolution. To frame four more pictures, the handle is pulled out, bringing the wheel *n* into mesh with the wheel *i* and throwing the wheel *m* out of gear with the wheel *h*. The wheels are now in position where the wheel *m* will be clear of the wheel *h* and the handle *o* will work clear of the pin *p*. With the wheels in this position, one half turn of the wheel *n* brings the notch *q* in the disk *j* to a point where the clutch *k* engages it and stops the movement of the film at the fourth picture. By releasing the clutch *k* until it is clear of the notch *q* the wheel *i* can be given one revolution and the film arrested at the eighth picture. The wheels are all of the same diameter and one full revolution exposes eight pictures. By holding down the clutch *k* the film can be run without interruption or stopped at a given point by letting go the clutch.

I claim:

In a projector for the display of moving pictures, the combination with the driving mechanism of a notched disk and a clutch to engage the same, so arranged as to arrest the movement of the film at predetermined points, with a picture in frame.

BENJAMIN J. SUCH.

Witnesses:
J. C. Coss,
W. H. Jacobsen.